(12) United States Patent
Asadipour et al.

(10) Patent No.: US 12,160,459 B2
(45) Date of Patent: Dec. 3, 2024

(54) REAL TIME TROUBLESHOOTING FOR VIDEO CONFERENCES

(71) Applicant: Zoom Video Communications, Inc., San Jose, CA (US)

(72) Inventors: Shania Asadipour, San Jose, CA (US); Xingzhi Luo, Sunnyvale, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 117 days.

(21) Appl. No.: 17/589,330

(22) Filed: Jan. 31, 2022

(65) Prior Publication Data

US 2023/0247078 A1    Aug. 3, 2023

(51) Int. Cl.
*H04L 65/80* (2022.01)
*H04L 65/403* (2022.01)

(52) U.S. Cl.
CPC ............ *H04L 65/80* (2013.01); *H04L 65/403* (2013.01)

(58) Field of Classification Search
CPC ...... H04N 7/15; H04N 21/233; H04L 65/103; H04L 65/403; H04L 65/80; H04L 41/22
See application file for complete search history.

(56) References Cited

U.S. PATENT DOCUMENTS

2008/0049625 A1*  2/2008  Edwards ................. H04L 45/26
                                                                370/252

* cited by examiner

*Primary Examiner* — Yosef K Laekemariam
(74) *Attorney, Agent, or Firm* — Kilpatrick Townsend & Stockton LLP

(57) ABSTRACT

One example method includes receiving, at a client, a plurality of real time performance measures associated with a currently-active video conference executing in a video conference application, determining, at the client, based on one or more of the plurality of real time performance measures or a user input, the presence of a fault associated with the currently-active video conference, determining, at the client, a plurality of potential causes of the fault based at least in part on the plurality of real time performance measures, providing, at the client, a notification of the presence of the fault to the user; and generating, at the client, a suggested action to alleviate the fault in real time, the suggested action based at least in part on the plurality of potential causes of the fault.

20 Claims, 7 Drawing Sheets

REAL TIME TROUBLESHOOTING FOR VIDEO CONFERENCES

FIELD

The present application generally relates to video conferencing and more particularly relates to real time troubleshooting for video conferences.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION OF THE DRAWINGS

Figure 1:
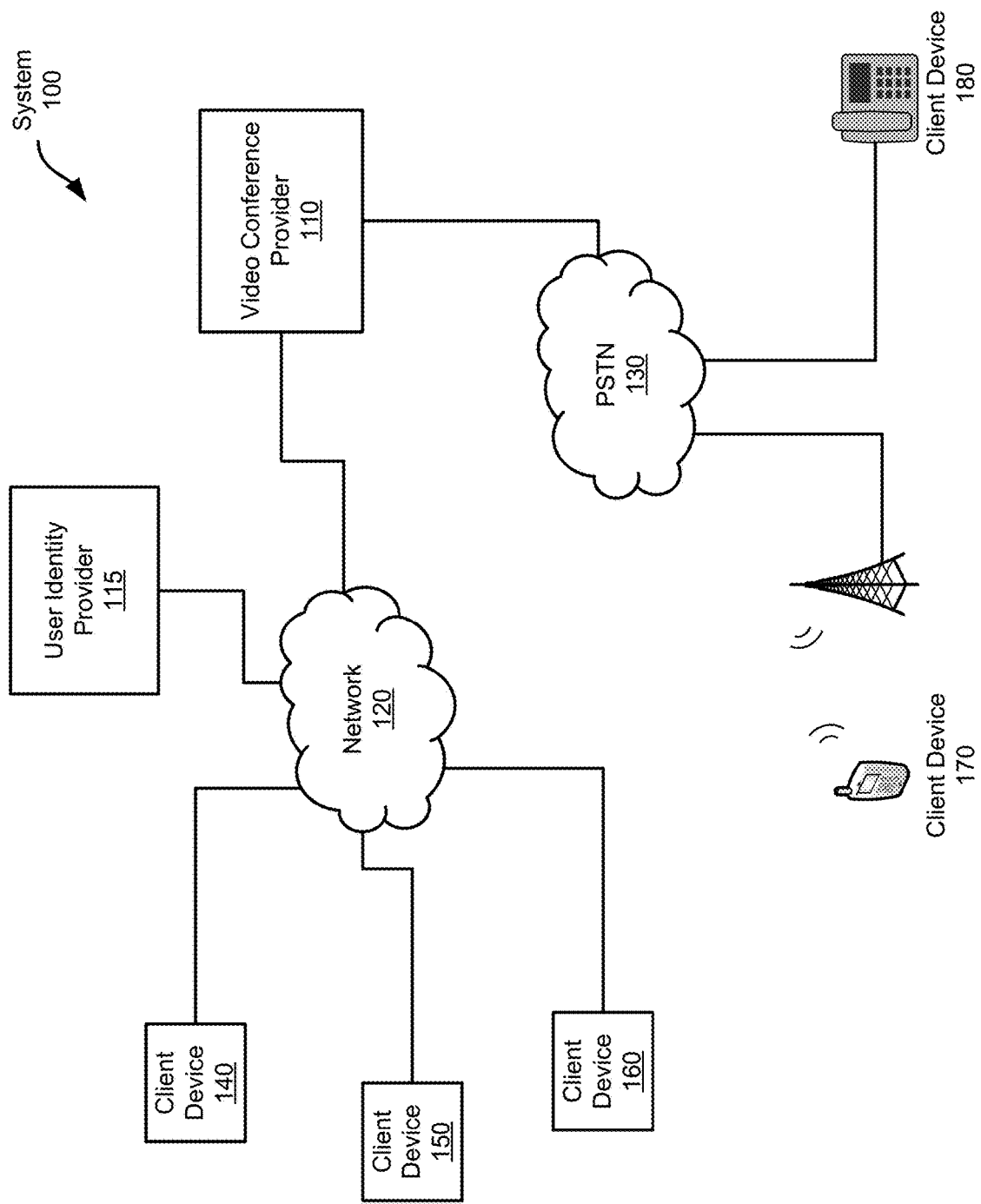
FIGS. 1-2 show example systems for real time troubleshooting for video conferences.

Examples are described herein in the context of real time troubleshooting for video conferences. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conferences provide a convenient mechanism for participants to interact remotely. Unfortunately, sometimes issues can arise during the video conference that cause the video conference to perform in a less than optimal way. For instance, the video may freeze or become unavailable. These sorts of issues can arise for any number of reasons and they can be difficult to diagnose and troubleshoot. Troubleshooting a video conference software in real time can be particularly challenging since many different factors can affect the meeting experience, such as packet loss, system resource limitation, and the network environment. In addition, the common techniques for debugging such issues involve complex tools and systems and specialized knowledge on how these systems interact and often require support from a technical support staff.

Examples of real time troubleshooting for video conferences allows a video conference application to receive real time performance measures for the hardware, software, and network elements supporting the video conference. When a fault occurs in the video conference, the video conferencing application notifies the user that a fault has occurred. For instance, if the video conference application detects that packet loss is occurring, it can notify the user that the Internet connection is potentially problematic.

The real time troubleshooting example can then attempt to determine a way to alleviate the fault. For instance, if the Internet connection is slow, the example system may determine that resetting the connection or identifying another connection may correct the fault. The example system then provides the user with a mechanism to implement the correction in real time.

Such systems provide numerous advantages over conventional troubleshooting methods. For example, the user may be able to alleviate a fault without reaching out to external support for help. Such a system could then theoretically lessen the need for dedicated support staff. Example systems are also able to alleviate problems as they occur so that a video conference can continue successfully rather than performing a post-hoc analysis after the video conference has ended or been cancelled.

This illustrative example is given to introduce the reader to the general subject matter discussed herein and the disclosure is not limited to this example. The following sections describe various additional non-limiting examples and examples of real time troubleshooting for video conferences.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
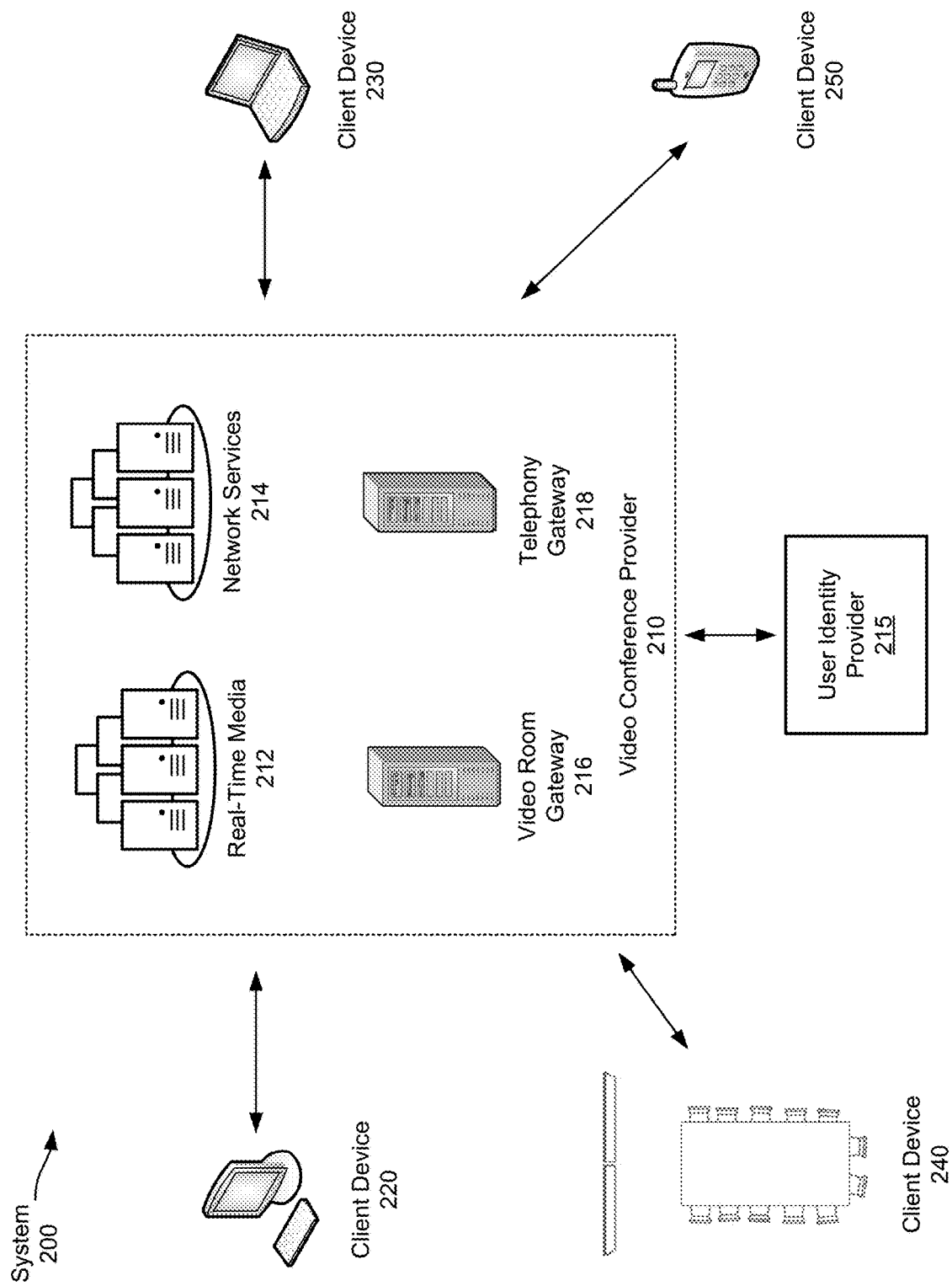

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real time media servers 212. The real time media servers 212 determine which protocol is optimal based on, for example, proxy settings and the presence of firewalls, etc. For example, the client device might select among UDP, TCP, TLS, or HTTPS for audio and video and UDP for content screen sharing.

The real time media servers 212 then multiplex the various video and audio streams based on the target client device and communicate multiplexed streams to each client device. For example, the real time media servers 212 receive audio and video streams from client devices 220-240 and only an audio stream from client device 250. The real time media servers 212 then multiplex the streams received from devices 230-250 and provide the multiplexed streams to client device 220. The real time media servers 212 are adaptive, for example, reacting to real time network and client changes, in how they provide these streams. For example, the real time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real time media servers 212 only deliver multiplex audio streams. The client device 220 may receive multiple streams for a particular communication, allowing the client device 220 to switch between streams to provide a higher quality of service.

In addition to multiplexing multimedia streams, the real time media servers 212 may also decrypt incoming multimedia stream in some examples. As discussed above, multimedia streams may be encrypted between the client devices 220-250 and the video conference system 210. In some such examples, the real time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real time media servers 212 may be involved in communicating data for a single meeting and multimedia streams may be routed through multiple different real time media servers 212. In addition, the various real time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real time media servers 212 to enable client devices in the same geographic region to have a high-quality connection into the video conference provider 210 via local servers 212 to send and receive multimedia streams, rather than connecting to a real time media server located in a different country or on a different continent. The local real time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real time media server 212 to handle multimedia streams to and from the requesting client device 220-250 and provides information to the client device 220-250 to connect to the identified real time media server 212. Additional client devices 220-250 may be added to the meeting as they request access through the network services server(s) 214.

After joining a meeting, client devices will send and receive multimedia streams via the real time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real time media server 212, and receives audio streams from the real time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
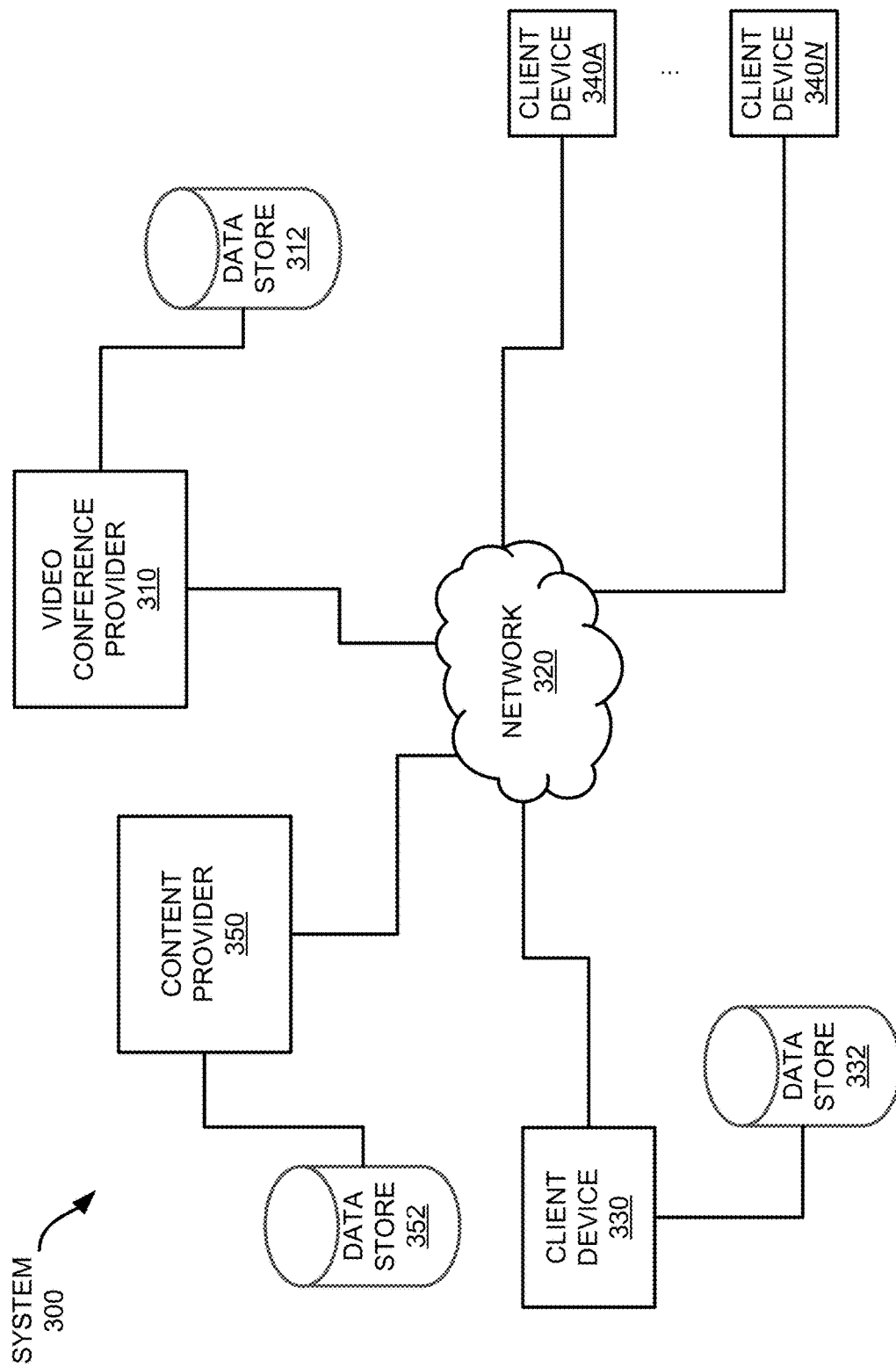
FIGS. 3A-3B show an example system and client device for real time troubleshooting for video conferences.
Figure 3B:
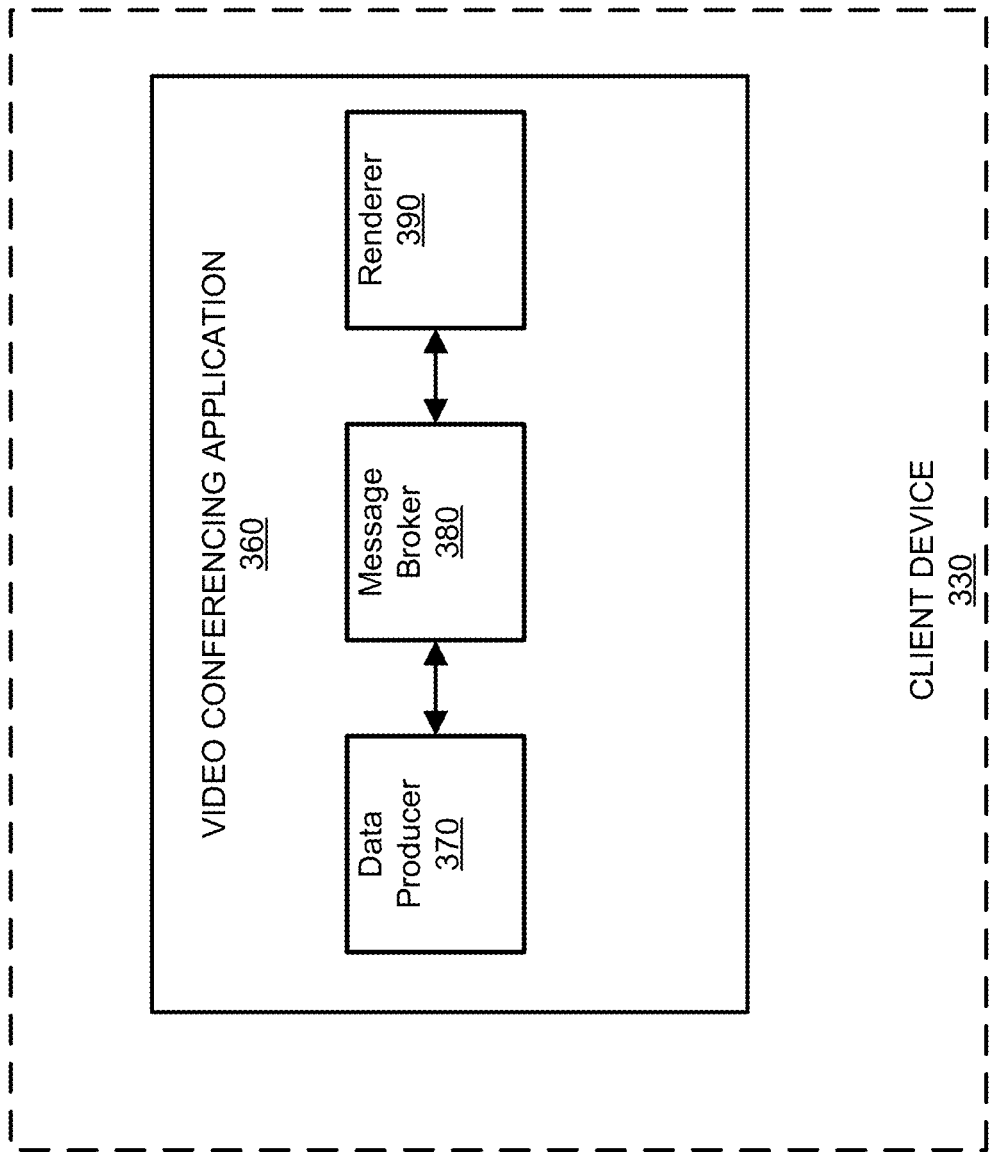

Referring now to FIGS. 3A-3B, FIG. 3A shows an example system 300 for real time troubleshooting for video conferences. The system 300 includes a video conference provider 310, multiple client device 330, 340a-n, and a content provider 350, which are connected to network 320, which may include one or more different public or private networks, such as the internet. The client devices 330, 340a-n in this example are connected to the video conference provider 310 and are participating in a video conference. The user of client device 330 executes a video conferencing application 360, shown in FIG. 3B, which connects to the video conference provider 310 to join the video conference and may provide additional functionality. As a part of connecting to the video conference, the video conferencing application activates the client device's camera and microphone to capture video and audio streams.

The example video conferencing application 360 includes a data producer 370, a message broker 380, and an renderer 390. The data producer 370 captures real time performance measures and can make them available to the message broker 380. For example, the data producer 370 may connect to the broker 380 and advertise that particular performance measures can be published and thus available for subscription.

In such an example, the message broker 380 can request that certain advertised data is collected by the data producer. And in return the data producer 370 publishes the data as it becomes available. For instance, for a real time performance measure such as processor utilization, the data producer 370 may publish the current utilization every second. The message broker 380 may collect various types of data, including data useful for troubleshooting. The message broker 380 shown in FIG. 3B also includes computer-executable instructions that are capable of identifying faults, as well as identifying potential ways to alleviate those faults. While the example shown in FIG. 3B combines the fault analyzer and message broker functionality in the message broker 380, in some examples, the functionality may be split into different functional components.

The video conferencing application 360 also includes a rendering engine, in this example, renderer 390. The renderer 390 requests and receives data from the message broker 380 and then renders display to a user. For instance, the renderer 390 render a small HTML page to be displayed within the user interface of the video conference client application as is shown in FIG. 4.

Figure 4:
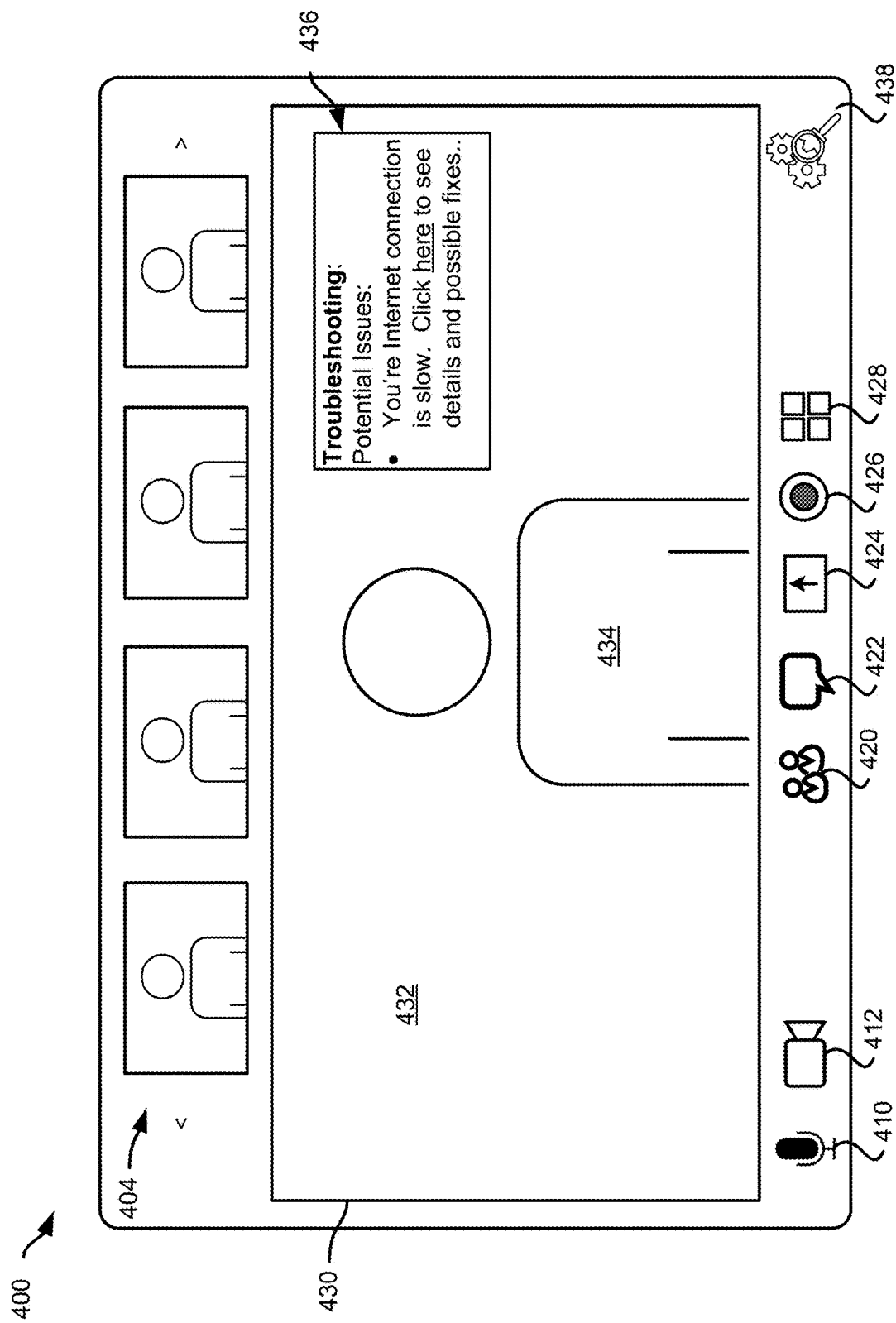
FIG. 4 shows an example graphical user interface ("GUI") for real time troubleshooting for video conferences.

Referring now to FIG. 4, FIG. 4 shows an example default GUI 400 presented to participants in a video conference. A client device, e.g., client device 330 or client devices 340a-n, executes a video conferencing application 360, which in turn displays the GUI 400 on the client device's display. In this example, the GUI 400 includes a speaker view window 430 that presents the current speaker 434 in the video conference. Above the speaker view window 430 are smaller participant windows 404, which allow the user to view some of the other participants in the video conference, as well as controls ("<" and ">") to let the host scroll to view other participants in the video conference.

Beneath the speaker view window 430 are a number of interactive elements 410-428, 438 to allow the participant to interact with the video conferencing application. Controls 410-412 may allow the participant to toggle on or off audio or video streams captured by a microphone or camera connected to the client device. Control 420 allows the participant to view any other participants in the video conference with the participant, while control 422 allows the participant to send text messages to other participants, whether to specific participants or to the entire meeting. Control 424 allows the participant to share content from their client device. Control 426 allows the participant toggle recording of the meeting, and control 428 allows the user to select an option to join a breakout room. And control 438 allows the user to display a real time troubleshooting display 436.

Referring to the speaker view window 430, in this example, it provides a view of the user 434 of client device 330, as captured by the camera 334, and a background 432.

Included in the speaker view window 432 is a real time troubleshooting content display 436. The real time troubleshooting content display field 436 displays the real time troubleshooting content provided by the video conference application 360. In the example shown, the real time troubleshooting content display 436 displays one or more potential faults. For example, the real time troubleshooting display includes a "potential issue" that states "You're Internet connection is slow." The real time troubleshooting display 436 may also display a potential mechanism or instruction for alleviating the or more faults. For instance, in the example shown, the real time troubleshooting display includes a link, labeled "here," that allows the user to drill-down and access potential ways to correct a fault. For example, the client application 360 may allow the user to access particular setting on the client device that may alleviate the fault.

Figure 5:
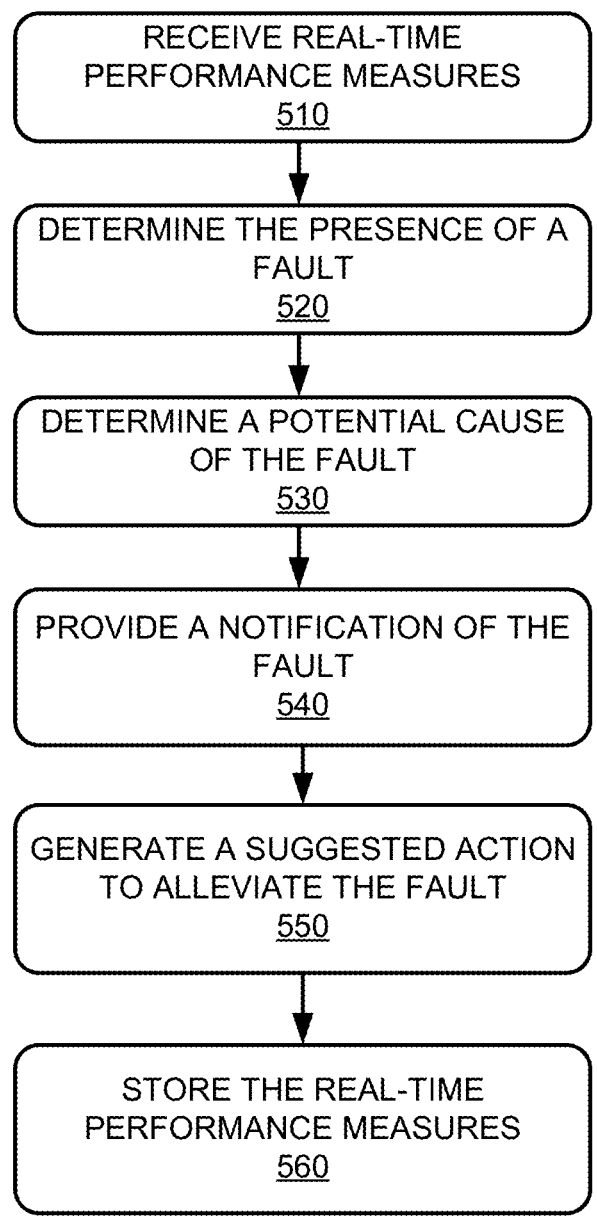
FIG. 5 shows an example method for real time troubleshooting for video conferences.

Referring to FIG. 5, FIG. 5 shows an example method for real time troubleshooting for video conferences. The example method 500 will be discussed with respect to the example system 300 shown in FIGS. 3A-3B and the GUI 400 shown in FIG. 4; however, any suitable system or GUI may be employed according to various examples. The user uses the video conferencing application 360 executed by their client device 330 to cause a video conference provider 310 to initiate a video conference, generally as discussed above with respect to FIGS. 1-2. Alternatively, or in addition, users use the video conferencing application to join video conferences that have previously been initiated.

At block 510, the client device 330 receives real time performance measures. Real time performance measures may be provided by the data producer 370. The data producer may be part of the video conference application 360 as shown in FIG. 3B or may be multiple components on the client device 330.

Real time performance measures may provide information related to any aspect of the client device 330, video conference application 360, the currently-active video conference, or other aspects that may affect the performance of the video conference, such as the network status. Thus, the real time performance measures may reflect the real time performance state of at least one of a hardware element, a software element, or a network element. The hardware element may include, for example, the performance of the processor(s) or memory of the client device 330. For example, a real time performance measure may reflect the overall processor or memory utilization.

The software element may include aspects such as the operating system, the video conference application, or libraries available on the client device 330 that the video conference application 360 may utilize to provide the currently-active video conference. For instance, a real time performance measure for a software element may indicate that a particular method or component is hung or is taking a relatively long-time to execute before returning to whatever component is calling it. Other types of performance measures may include information, such as device firmware or the configuration. Performance measures related specifically to the video conference application 360 may include resolution, frame rate, or restarts.

The network element may include, for example, one of a connection speed, a connection latency, or a network adaptor. For instance, a performance measure related to a network element may indicate a latency present in a connection associated with the currently-active video conference. Alternatively, or in addition, a performance measure related to a network element may include a measure of packet loss. Such measures may provide insight as to why a video conference is performing inconsistently by, for example, dropping video for some participants or demonstrating jitter. Other aspects of the network that may be reflected may include bandwidth or throughput. Other examples may include firewall performance or setting and measures related to a bridge or multipoint control unit ("MCU").

At block 520, the video conferencing application 360 determines the presence of a fault. The presence of a fault may be detected based on one or more of the real time performance measures. For instance, if the processor utilization stays at one hundred percent for a period of time, that may indicate a fault. Alternatively, the user may indicate that a fault has occurred.

The determination of a fault in the video conference application 360 is performed by the message broker 380. For example, as the message broker 380 receives data from the data provider 370, an artificial intelligence model executed by the message broker 380 may identify that a particular combination of real time performance measure values indicates a particular type of fault.

At block 530, the video conference application 360 determines the potential cause for the fault. For example, the message broker 280 may execute the AI model or a separate AI model that provided with the fault and the set of real time performance measures is able to determine what is likely causing the fault. In other cases, the message broker 380 may utilize more traditional programming techniques to analyze the real time performance measures. For example, the current value of a performance measure may be compared to various ranges of values for the performance measure to determine a fault has occurred.

At block 540, the video conference application 360 provides a notification of the fault. For instance, in the example shown in FIG. 4, the video conference application displays the notification in the real time troubleshooting display 436. In the example shown, the notification is displayed to the user in the main video conference window 432 in order to draw the user's attention. Other mechanisms of notifying the user may be utilized, such as an audio notification.

At block 550, the video conference application 360 generates a suggested action to alleviate the fault. The suggested action may, for instance, be an instruction for changing a setting or resetting the video conference application 360. In other examples, the suggested action may include instructions for performing further evaluation. In yet other examples, the suggested action may be to click a link in the real time troubleshooting display 436 which causes code to execute to correct or address the fault.

At block 560, the video conference application 360 stores the real time performance measures in a data store. The real time performance measures may be stored locally, such as in data store 332, or transmitted to the video conference provider 310 to be stored in data store 312. By storing the real time performance measures, a post-hoc analysis of the plurality of performance measures may be used to identify the presence of one or more faults and one or more causes of the faults in addition to the real time troubleshooting provided by the examples described herein.

Figure 6:
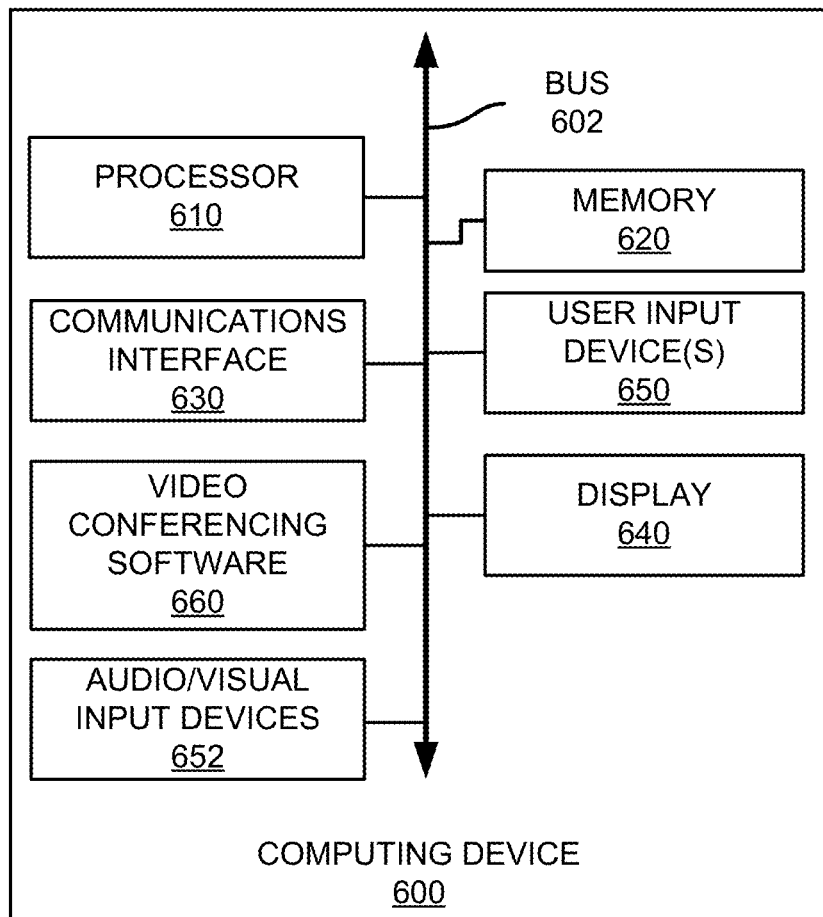
FIG. 6 shows an example computing device suitable for use with example systems and methods for real time troubleshooting for video conferences.

Referring now to FIG. 6, FIG. 6 shows an example computing device 600 suitable for use in example systems or methods for real time troubleshooting for video conferences according to this disclosure. The example computing device 600 includes a processor 610 which is in communication with the memory 620 and other components of the computing device 600 using one or more communications buses 602. The processor 610 is configured to execute processor-executable instructions stored in the memory 620 to perform one or more methods for real time troubleshooting for video conferences according to different examples, such as part or all of the example method 500 described above with respect to FIG. 5. The computing device 600, in this example, also includes one or more user input devices 650, such as a keyboard, mouse, touchscreen, microphone, etc., to accept user input. The computing device 600 also includes a display 640 to provide visual output to a user.

In addition, the computing device 600 includes a video conferencing application 660 to enable a user to join and participate in a video conference, such as a conventional meeting or webinar, by receiving multimedia streams from a video conference provider, sending multimedia streams to the video conference provider, joining and leaving breakout rooms, etc. such as described throughout this disclosure, etc.

The computing device 600 also includes a communications interface 640. In some examples, the communications interface 630 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

The various examples described herein include systems, methods, and computer-readable media for real time troubleshooting for video conferences. In a first aspect, a method may include receiving, at a client, a plurality of real time performance measures associated with a currently-active video conference executing in a video conference application, determining, at the client, based on one or more of the plurality of real time performance measures or a user input, the presence of a fault associated with the currently-active video conference, determining, at the client, a plurality of potential causes of the fault based at least in part on the plurality of real time performance measures, providing, at the client, a notification of the presence of the fault to the user, and generating, at the client, a suggested action to alleviate the fault in real time, the suggested action based at least in part on the plurality of potential causes of the fault.

A second aspect may include the first aspect and also include functionality wherein the plurality of real time performance measures associated with a currently-active video conference are received from the video conferencing application by a message broker, the presence of the fault associated with the currently-active video conference is determined by a fault analyzer, the fault analyzer receiving the real time performance measures through a subscription to the message broker, and the notification is provided to the client by a rendering engine in communication with the fault analyzer.

A third aspect may include the first aspect or second aspect and also include functionality wherein the real time performance measures reflect a real time performance state of at least one of a hardware element, a software element, or a network element.

A fourth aspect may include any of the first through third aspects, and also include functionality wherein the hardware element comprises at least one of a processor or a memory of the client device.

A fifth aspect may include any of the first through fourth aspects, and also include functionality wherein the software element comprises at least one of a video conference application or a software library.

A sixth aspect may include any of the first through fifth aspects and also include functionality wherein the time zone-specific content comprises a flag associated with the location.

A seventh aspect may include any of the first through sixth aspects, and also include functionality further comprising storing the plurality of real time performance measures in a data store on the client device, and performing a post-hoc analysis of the plurality of performance measures to identify the presence of the fault and the one or more causes of the fault.

In an eight aspect, a non-transitory computer-readable medium includes processor-executable instructions configured to cause one or more processors receive, at a client, a plurality of real time performance measures associated with a currently-active video conference executing in a video conference application, determine, at the client, based on one or more of the plurality of real time performance measures or a user input, the presence of a fault associated with the currently-active video conference, determine, at the client, a plurality of potential causes of the fault based at least in part on the plurality of real time performance measures, provide, at the client, a notification of the presence of the fault to the user, and generate, at the client, a suggested action to alleviate the fault in real time, the suggested action based at least in part on the plurality of potential causes of the fault.

An ninth aspect includes the eighth aspect and further includes functionality wherein the plurality of real time performance measures associated with a currently-active video conference are received from the video conferencing application by a message broker, the presence of the fault associated with the currently-active video conference is determined by a fault analyzer, the fault analyzer receiving the real time performance measures through a subscription to the message broker, and the notification is provided to the client by a rendering engine in communication with the fault analyzer.

An tenth aspect includes the eighth aspect and ninth aspects further includes functionality wherein the real time performance measures reflect a real time performance state of at least one of a hardware element, a software element, or a network element.

An eleventh aspect includes the eighth through tenth aspects and further includes functionality wherein the hardware element comprises at least one of a processor or a memory of the client device.

A twelfth aspect includes the eighth through eleventh aspects and further includes functionality wherein the software element comprises at least one of a video conference application or a software library.

A thirteenth aspect includes any of the eighth through twelfth aspects and further functionality wherein the network element comprises at least one of a connection speed, a connection latency, or a network adaptor.

A fourteenth aspect includes any of the eighth through thirteenth aspects and further includes functionality store the plurality of real time performance measures in a data store on the client device, and perform a post-hoc analysis of the plurality of performance measures to identify the presence of the fault and the one or more causes of the fault.

In a fifteenth aspect, a device includes a communications interface; a non-transitory computer-readable medium; and one or more processors configured to execute processor-executable instructions stored in the non-transitory computer-readable medium receive, at a client, a plurality of real time performance measures associated with a currently-active video conference executing in a video conference application, determine, at the client, based on one or more of the plurality of real time performance measures or a user input, the presence of a fault associated with the currently-active video conference, determine, at the client, a plurality of potential causes of the fault based at least in part on the plurality of real time performance measures, provide, at the client, a notification of the presence of the fault to the user, and generate, at the client, a suggested action to alleviate the fault in real time, the suggested action based at least in part on the plurality of potential causes of the fault.

A sixteenth aspect includes the fifteenth aspect and also includes functionality wherein the plurality of real time performance measures associated with a currently-active video conference are received from the video conferencing application by a message broker, the presence of the fault associated with the currently-active video conference is determined by a fault analyzer, the fault analyzer receiving the real time performance measures through a subscription to the message broker, and the notification is provided to the client by a rendering engine in communication with the fault analyzer.

A seventeenth aspect includes the fifteenth through sixteenth aspects and also includes functionality wherein the real time performance measures reflect a real time performance state of at least one of a hardware element, a software element, or a network element.

An eighteenth aspect includes the fifteenth through seventeenth aspects and also includes functionality wherein the hardware element comprises at least one of a processor or a memory of the client device.

A nineteenth aspect includes the fifteenth through eighteenth aspects and also includes functionality wherein the software element comprises at least one of a video conference application or a software library.

A twentieth aspect includes the fifteenth through nineteenth aspects and also includes functionality wherein the network element comprises at least one of a connection speed, a connection latency, or a network adaptor.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
   receiving, at a client device, a plurality of real time performance measures associated with a currently-active video conference executing in a video conference application executed by the client device;
   determining, at the client device by the video conference application, based on one or more of the plurality of real time performance measures or a user input, the presence of a fault associated with the currently-active video conference;
   determining, at the client device by the video conference application, a plurality of potential causes of the fault based at least in part on the plurality of real time performance measures;
   providing, at the client device by the video conference application, a notification of the presence of the fault to the user; and
   generating, at the client device by the video conference application, a suggested action to alleviate the fault in real time, the suggested action based at least in part on the plurality of potential causes of the fault.

2. The method of claim 1, wherein:
the plurality of real time performance measures associated with a currently-active video conference are received from the video conferencing application by a message broker;
the presence of the fault associated with the currently-active video conference is determined by a fault analyzer, the fault analyzer receiving the real time performance measures through a subscription to the message broker; and
the notification is provided to the client device by a rendering engine in communication with the fault analyzer.

3. The method of claim 1, wherein the real time performance measures reflect a real time performance state of at least one of a hardware element, a software element, or a network element.

4. The method of claim 3, wherein the hardware element comprises at least one of a processor or a memory of the client device.

5. The method of claim 3, wherein the software element comprises at least one of a video conference application or a software library.

6. The method of claim 3, wherein the network element comprises at least one of a connection speed, a connection latency, or a network adaptor.

7. The method of claim 1, further comprising:
storing the plurality of real time performance measures in a data store on the client device; and
performing a post-hoc analysis of the plurality of performance measures to identify the presence of the fault and the one or more causes of the fault.

8. A non-transitory computer-readable medium comprising processor-executable instructions configured to cause one or more processors to:
receive, at a client device, a plurality of real time performance measures associated with a currently-active video conference executing in a video conference application;
determine, at the client device, based on one or more of the plurality of real time performance measures or a user input, the presence of a fault associated with the currently-active video conference;
determine, at the client device, a plurality of potential causes of the fault based at least in part on the plurality of real time performance measures;
provide, at the client device, a notification of the presence of the fault to the user; and
generate, at the client device, a suggested action to alleviate the fault in real time, the suggested action based at least in part on the plurality of potential causes of the fault.

9. The non-transitory computer-readable medium of claim 8, wherein:
the plurality of real time performance measures associated with a currently-active video conference are received from the video conferencing application by a message broker;
the presence of the fault associated with the currently-active video conference is determined by a fault analyzer, the fault analyzer receiving the real time performance measures through a subscription to the message broker; and
the notification is provided to the client device by a rendering engine in communication with the fault analyzer.

10. The non-transitory computer-readable medium of claim 8, wherein the real time performance measures reflect a real time performance state of at least one of a hardware element, a software element, or a network element.

11. The non-transitory computer-readable medium of claim 10, wherein the hardware element comprises at least one of a processor or a memory of the client device.

12. The non-transitory computer-readable medium of claim 10, wherein the software element comprises at least one of a video conference application or a software library.

13. The non-transitory computer-readable medium of claim 10, wherein the network element comprises at least one of a connection speed, a connection latency, or a network adaptor.

14. The non-transitory computer-readable medium of claim 10, further comprising processor-executable instructions configured to cause one or more processors to:
store the plurality of real time performance measures in a data store on the client device; and
perform a post-hoc analysis of the plurality of performance measures to identify the presence of the fault and the one or more causes of the fault.

15. A device comprising:
a communications interface;
a non-transitory computer-readable medium; and
one or more processors configured to execute processor-executable instructions stored in the non-transitory computer-readable medium to:
receive, at a client device, a plurality of real time performance measures associated with a currently-active video conference executing in a video conference application;
determine, at the client device, based on one or more of the plurality of real time performance measures or a user input, the presence of a fault associated with the currently-active video conference;
determine, at the client device, a plurality of potential causes of the fault based at least in part on the plurality of real time performance measures;
provide, at the client device, a notification of the presence of the fault to the user; and
generate, at the client device, a suggested action to alleviate the fault in real time, the suggested action based at least in part on the plurality of potential causes of the fault.

16. The device of claim 15, wherein:
the plurality of real time performance measures associated with a currently-active video conference are received from the video conferencing application by a message broker;
the presence of the fault associated with the currently-active video conference is determined by a fault analyzer, the fault analyzer receiving the real time performance measures through a subscription to the message broker; and
the notification is provided to the client device by a rendering engine in communication with the fault analyzer.

17. The device of claim 15, wherein the real time performance measures reflect a real time performance state of at least one of a hardware element, a software element, or a network element.

18. The device of claim 17, wherein the hardware element comprises at least one of a processor or a memory of the client device.

19. The device of claim 17, wherein the software element comprises at least one of a video conference application or a software library.

20. The device of claim 17, wherein the network element comprises at least one of a connection speed, a connection latency, or a network adaptor.

* * * * *